F. D. Parmele,
Tanning Apparatus,
No. 4,253. Patented Nov. 1, 1845.
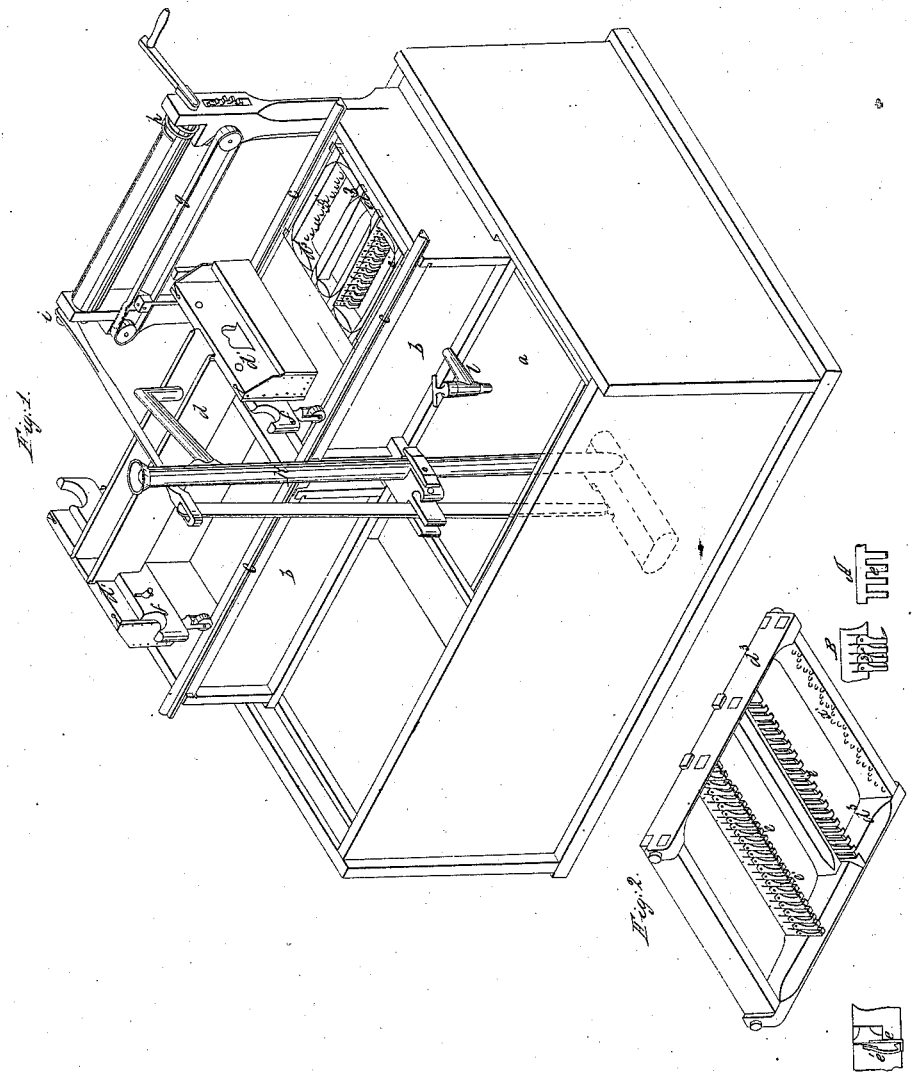

UNITED STATES PATENT OFFICE.

FRANCIS D. PARMELE, OF AKRON, OHIO.

TANNING.

Specification of Letters Patent No. 4,253, dated November 1, 1845.

*To all whom it may concern:*

Be it known that I, FRANCIS D. PARMELE, of Akron, in the county of Summit and State of Ohio, have invented a new and Improved Apparatus for Tanning Leather; and I do hereby declare that the following is a full, clear, and exact description of the principle or character thereof and what distinguishes from all other things before known and of the manner of making, constructing, and using the same, reference being had to the accompanying drawings, forming part of this specification, in which—

Figure 1 is an isometrical view, and Fig. 2 is the frame to which the hides are suspended.

The same letters indicate like parts in both the figures.

The nature of my improvements consists in furnishing the hides with a constant supply of fresh ooze, and draining them thoroughly which is essential to accelerate the process of tanning.

The apparatus for effecting this is as follows: a vat or reservoir ($a$) is sunk for the purpose of containing ooze, or tanning liquor; on one side and above said reservoir are vats ($b$, $b$) the bottoms of which are on a level with the reservoir below; on the top of these vats are rails ($c$), one on each side, on which the wheels of a traversing car, hereinafter to be described, run; in these vats are frames ($d^3$), so constructed that they can be turned up when desired, the ends of the frame being projected far enough to rest in notches formed in the sides of the vat and serve as a pivot for the frame to be turned on. A more perfect representation of these frames is shown in Fig. 2. The cross bars of the frame have a series of inflexible hooks ($e$) projecting down from them, one of which is more perfectly represented at (A, detached) and between these the hides are put, where they are fastened by means of flexible hooks $e'$ (shown detached at B) which pass through them; on the ends are staples $x'$ also to attach the hides to. The hides are thus suspended near together, but without touching, in the smallest space, for draining and hang vertically from the frame, in the vats.

The carriage above named is composed of two cross pieces ($f$), which have the wheels, that the carriage runs on connected with them; these pieces support an oblong box, or trough ($d$) that connects them; at each end of which there is another trough ($d'$), at right angles to the first, these latter ones are pierced with a row of holes at the bottom not shown in the drawing and are long enough to extend from side to side of the vats; the long trough ($d$) that connects them is long enough to extend from one end of one vat along its whole length to the next vat, so that when the carriage traverses a distance equal to the length of one vat, it will bring the cross troughs over the two vats that it spans; it will be obvious that any number of vats each having a cross trough ($d'$) can be placed in line, and the carriages connected so as to move with the same power. The carriage is moved by means of its connection with an endless belt ($g$), which passes over two pulleys placed at a distance apart equal to the length of the motion desired, and forms a common traverse motion; a pinion on one of the pulleys gears into a worm wheel ($h$) by which it is driven; the shaft of the worm wheel may have a crank ($i$) on it, that connects with and works a pump ($k$), that pumps up the ooze from the reservoir into the trough ($d$), which traverses under it and receives and distributes the ooze through the pierced bottoms of the cross troughs ($d'$) over the hides that are suspended below; the ooze then drains down and runs off through a stop cock or gate ($l$) in the vat, again into the reservoir where it is pumped from and is so made to circulate; the strength of the ooze being kept up by a supply from the leeches.

Having thus fully described my apparatus for tanning hides what I claim as my invention and desire to secure by Letters Patent is—

The combination of a traversing carriage for distributing the ooze on the hides, substantially as above described, with a vat or vats, in which said hides are suspended, and from which the spent liquor can drain.

FRANS. D. PARMELE.

Witnesses:
CHS. M. KELLER,
J. J. GREENOUGH.